US009219309B2

(12) United States Patent
Costas et al.

(10) Patent No.: US 9,219,309 B2
(45) Date of Patent: Dec. 22, 2015

(54) GEODESIC LENS ANTENNA WITH AZIMUTH AND ELEVATION BEAMFORMING

(75) Inventors: Carlos R. Costas, Brandon, FL (US); Millage G. Burnsed, St. Petersburg, FL (US); Daniel P. Jones, Pinellas Park, FL (US)

(73) Assignee: RAYTHEON COMPANY, Waltham, MA (US)

( * ) Notice: Subject to any disclaimer, the term of this patent is extended or adjusted under 35 U.S.C. 154(b) by 718 days.

(21) Appl. No.: 13/554,304

(22) Filed: Jul. 20, 2012

(65) Prior Publication Data

US 2014/0022126 A1 Jan. 23, 2014

(51) Int. Cl.
| | | |
|---|---|---|
| H01Q 3/00 | (2006.01) | |
| H01Q 3/26 | (2006.01) | |
| H04B 7/06 | (2006.01) | |
| H01Q 25/00 | (2006.01) | |
| H01Q 1/24 | (2006.01) | |
| H01Q 13/00 | (2006.01) | |

(52) U.S. Cl.
CPC ............. H01Q 3/26 (2013.01); *H01Q 1/246* (2013.01); *H01Q 13/00* (2013.01); *H01Q 25/00* (2013.01); *H04B 7/0617* (2013.01)

(58) Field of Classification Search
CPC ........... H01Q 3/34; H01Q 3/26; H01Q 25/00; H01Q 1/246; H04B 7/0617
USPC ........................................................ 342/368
See application file for complete search history.

(56) References Cited

U.S. PATENT DOCUMENTS

| | | | | | |
|---|---|---|---|---|---|
| 3,343,171 | A | * | 9/1967 | Goodman, Jr. ................ | 343/754 |
| 3,697,998 | A | * | 10/1972 | Schaufelberger ............. | 343/754 |
| 4,114,162 | A | * | 9/1978 | Wild ............................. | 343/754 |
| 4,185,289 | A | * | 1/1980 | DeSantis et al. .............. | 343/770 |
| 4,671,606 | A | * | 6/1987 | Yevick ........................... | 385/33 |
| 6,011,520 | A | * | 1/2000 | Howell et al. ................. | 343/769 |

OTHER PUBLICATIONS

Cramer; "Geodesic Cone Antenna;" Proceedings of the Antenna Application s Symposium (ADA142003), vol. 1; Mar. 1984; pp. 165-189.
Williams et al.; "Lightweight Agile Beam Antennas for UAVS;" Military Communications Conference; Oct. 23-25, 2006; pp. 1-5.

* cited by examiner

*Primary Examiner* — Frank J McGue
(74) *Attorney, Agent, or Firm* — Daly, Crowley, Mofford & Durkee, LLP

(57) ABSTRACT

An array of geodesic lens antennas (GLAs) comprises multiple vertical radiating slots, each formed into an annulus, which are individually controlled by feeding rings. One feeding ring is provided for each of the GLA elevation elements, resulting in multiple, parallel waveguide channels that together enable elevation beam steering, thus forming a concentric stack of geodesic lenses. Accordingly, exemplary embodiments of the invention are capable of RF beam formation in azimuth and elevation by using these lenses to form, shape, and steer one or more RF beams. Each GLA in the stack forms an element in the elevation plane with separate amplitude and phase control, providing the degrees of freedom required to independently and simultaneously control azimuth and elevation beam forming and steering.

20 Claims, 9 Drawing Sheets

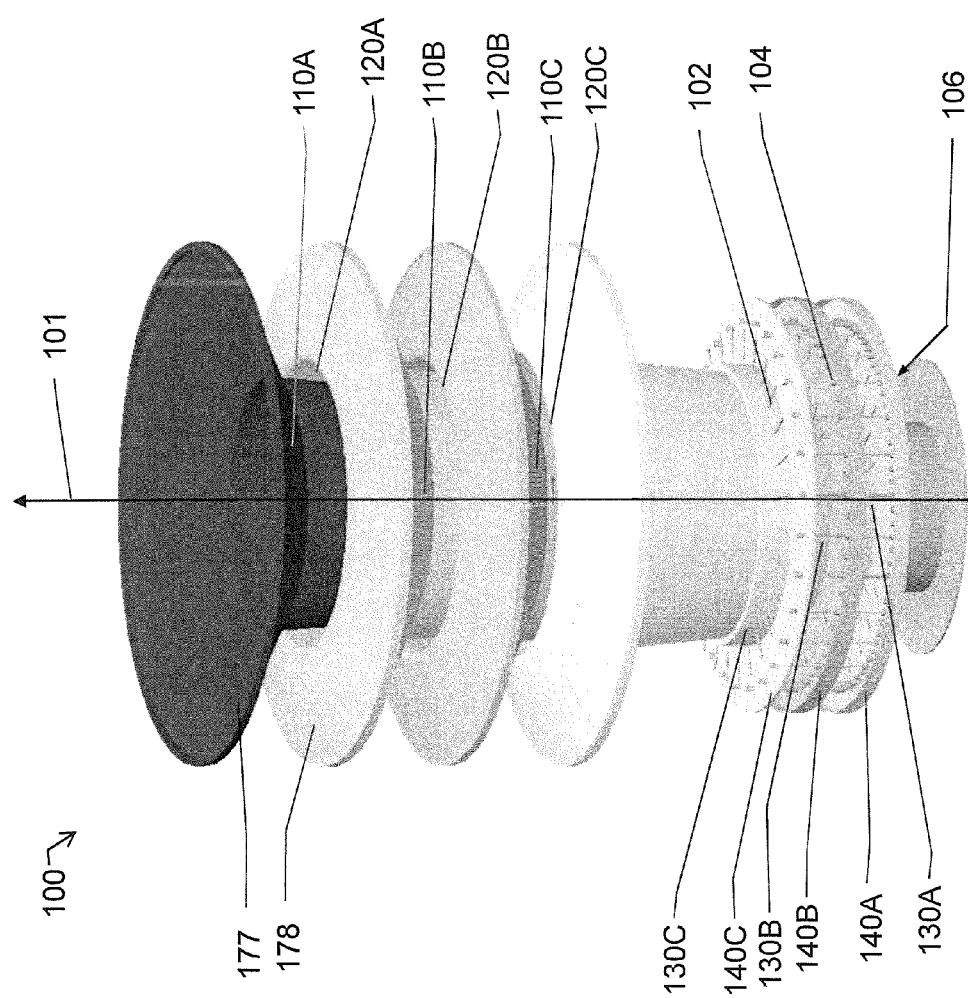

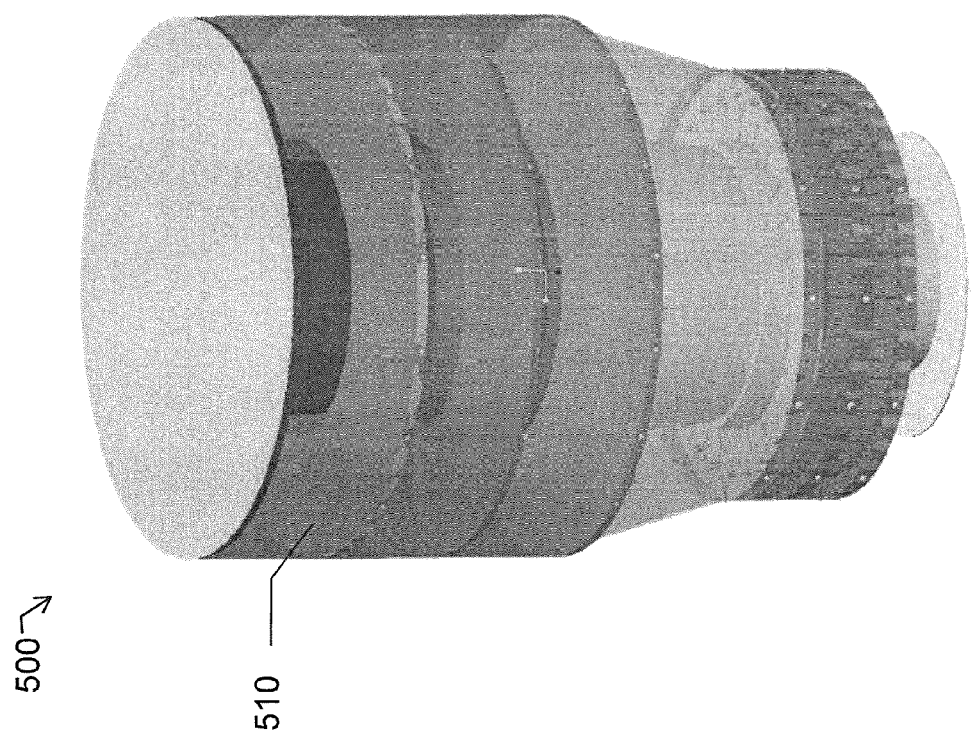

GEODESIC LENS ANTENNA WITH AZIMUTH AND ELEVATION BEAMFORMING

BACKGROUND

A conventional geodesic lens antenna (GLA) can provide an antenna solution for low cost, and weight restricted applications. A typical geodesic lens antenna has many advantages, including simplicity of design. Due to its ease of construction and design, geodesic apertures are suited for applications that require 360° coverage in azimuth. For certain applications it is desired to perform simultaneous azimuth and elevation beam pointing, while still using a simple, low part count, geodesic lens approach.

One drawback of known GLAs is the inability to form antenna beams in two simultaneous dimensions (namely, azimuth and elevation). One conventional approach to solving this shortcoming is to adding azimuthal slots in the vertical dimension. For example, the geodesic slotted cylindrical antenna of Howell, et al., U.S. Pat. No. 6,011,520, (incorporated herein by reference in its entirety) incorporates horizontal radiating slots in the geodesic lens cone to create an elevation illumination profile for elevation beam shaping. This approach does not provide for elevation beam steering by purely electrical means, however. Furthermore, the time of arrival to the horizontal slots varies with frequency and is limited to narrow band operations due to elevation "beam walk" (or "beam wander") caused by the frequency sensitivity of the horizontal slot approach.

Another attempt to solve this and other related problems may be seen in the geodesic cone antenna of B. S. Cramer, "Geodesic Cone Antenna," Proceedings of the Antenna Applications Symposium (ADA142003), vol. 1, March 1984, incorporated herein by reference in its entirety. However, the proposed design is not capable of elevation steering.

Similarly, another antenna design is discussed in Wyman Williams and Chris Burton, "Lightweight agile beam antennas for UAVs," Proceedings of the 2006 IEEE Conference on Military Communications (MILCOM '06), IEEE Press, Piscataway, N.J., USA, pp. 115-119, incorporated herein by reference in its entirety. This design is also not capable of elevation steering, but does allow a certain amount of beamforming.

What is needed is a relatively simple, yet compact, geodesic lens antenna system that is able to provide full electronic azimuth and elevation beam steering.

SUMMARY

In contrast to the above-described conventional approaches, embodiments of the invention are directed to an array of geodesic lens antenna (GLA) elements configured to provide azimuth and elevation beam steering over a wide range of frequencies and with a wide bandwidth.

In one exemplary embodiment, an array of GLAs comprises multiple vertical radiating slots, each formed into an annulus, that are individually controlled by feeding rings. One feeding ring is provided for each of the desired elevation "elements," resulting in multiple, parallel waveguide channels that enable elevation beam steering. These vertical, radiating slots may thus form a concentric stack of geodesic lenses.

Accordingly, exemplary embodiments of the invention are capable of RF beam formation in azimuth and elevation by using lenses above and below a middle geodesic lens to form, shape, and steer the beam. Each GLA in the stack is thus an "element" in the elevation plane with separate amplitude and phase control. This provides the degrees of freedom required to independently (and simultaneously) control azimuth and elevation beam forming and steering.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. It is understood that the drawings are not necessarily to scale.

FIG. 1 is an isometric illustration of an array of three geodesic lens antennas, according to one embodiment of the present invention.

FIG. 5 is an isometric illustration of a three-GLA array with a surrounding radome, according to another embodiment of the present invention.

DETAILED DESCRIPTION

Figure 2A:
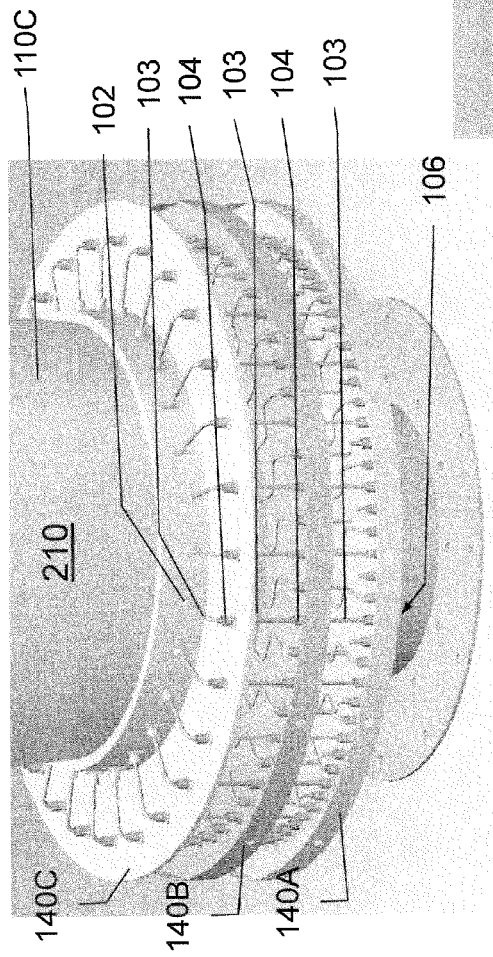
FIG. 2A is an illustration of the feed element network for a three-GLA array, according to one embodiment of the present invention.

Embodiments of the present system are directed to an array of geodesic lens antenna (GLA) elements arranged in a nested coaxial stack such that each GLA element is individually fed from a plurality of feed elements. By means of adjustments to the feed element amplitude and relative phase in each GLA, azimuthal beam control is achieved. Feed element control in amplitude and phase in each GLA element relative to the other GLA elements enables elevation beam forming and steering. Thus, the presently-disclosed nested plurality of coaxial geodesic lenses provides elevation and azimuth beam forming and steering in a compact, simplified antenna array.

One embodiment of the invention is directed to an antenna 100 formed of nested plurality of geodesic lens antenna 110A-110C, wherein each geodesic lens is individually fed by a plurality of feed elements 102 disposed in a ring 130 concentric with the primary axis 101 of each geodesic lens, as depicted in FIG. 1. A geodesic parallel plate waveguide can be created by forming a parallel plate waveguide from a pair of matched conformal structures, such as a pair of cylinders or, as here, a pair of conic sections, made from a conductive material. More specifically, by placing a cone of conductive material within another cone of conductive material, a parallel plate waveguide can be formed with each cone representing the opposing plates of the waveguide. The parallel plate waveguide formed thereby has no side walls. The theory of operation and construction of a geodesic cone antenna may be further explored in B. S. Cramer, "Geodesic Cone Antenna," Proceedings of the Antenna Applications Symposium (ADA142003), vol. 1, March 198, incorporated herein by reference in its entirety.

In the concepts, systems, and techniques disclosed herein, a flared section (in one exemplary embodiment, a biconical horn) at the top of the inner cone is employed to further focus the resulting waveguide radiation pattern, thus creating the geodesic lens. As depicted in FIG. 1, the top-most flared section 177 is the inner wall of the innermost of the three GLAs, GLA 110A; the outer wall of GLA 110A (178) forms the inner wall of GLA 110B. (Flared portions 177 and 178 thus form aperture 120A; the corresponding wall pairs form corresponding apertures 120B and 120C.) In like fashion, outer wall 210 (illustrated in FIG. 2A) forms the second parallel cone of GLA 110C. FIG. 3 further illustrates the use of the biconical horn and nested concentric cone structure of antenna 100. (In this cut-away view, a cover or radome 310 is shown. One of ordinary skill in the art will appreciate that such RF-transparent, low-loss environmental covers may be used with antenna of various types, without limitation.)

Referring to FIG. 1 again, the plurality of geodesic lenses 110A-110C are stacked vertically so that their primary axes are parallel and coincident, with the lens apertures 120A-120C arrayed linearly along the primary axis 101. The respective radial feed element arrays 130A-130C are each disposed in a plane perpendicular to the lens axis 101 and offset from one another along that axis.

The relatively large number of RF feed elements 102 in the feed element array 130A-130C of each geodesic lens 110A-110C is handled using a tiered (or layered) system of radial feed probe arrays 130A-130C, where each probe is equally spaced radially along the circumference of each geodesic lens antenna 110A-110C but staggered or offset relative to the other GLAs 110A-110C, as illustrated in FIGS. 1-4. In this way, each geodesic lens is fed separately by a single set of feed probes all located in the same tier at the near end of the GLA (i.e., the end proximate to the end connectors 106 discussed below and distal from the wave-launching apertures 120A-120C). Each feed tier is located so as to avoid physical or mechanical interference with the other tiers.

Feed element arrays (not visible) are each incorporated into support flanges 140A-140C, which provide both mechanical support for geodesic lenses 110A-110C and the necessary structure for feed-throughs 104 that connect feed elements 102 to end connectors 106 (not visible here).

Figure 3:
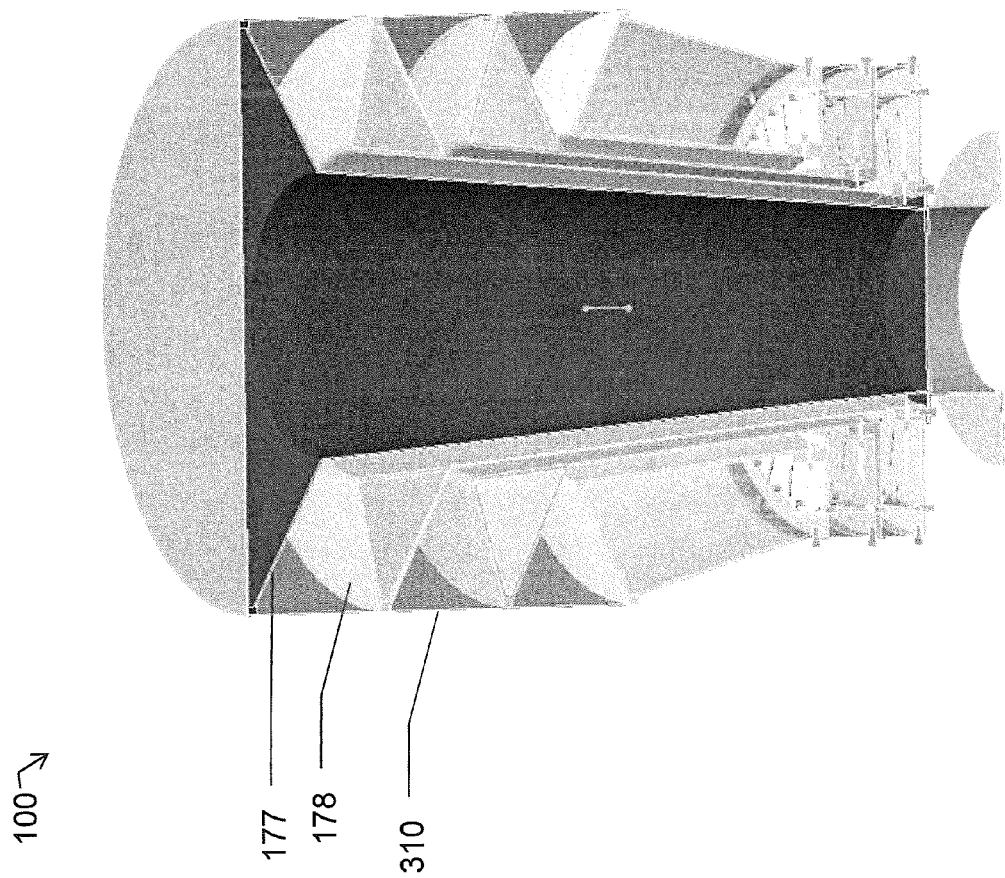
FIG. 3 is a cut-away side view of a three-GLA array, according to one embodiment of the present invention.

FIG. 2A is an expanded view of the feed element network for the three-GLA array depicted in FIG. 1, according to one embodiment of the present invention. In this view, a representative feed element 102 is shown penetrating outer wall 210 of GLA 110C. Feed element (or probe) 102 is connected to end connector 106 by one or more feed throughs 104 and waveguide sections 103. In this exemplary embodiment, outermost GLA 110C is fed from feed element array 130C (referring to FIG. 1); the waveguide connection to corresponding end connectors 106 for each feed element 102 passes through support flange 140C, then 140B and finally through support flange 140A. The connection to the corresponding end connector 106 for a feed element of GLA 110A (the innermost GLA) has a shorter path, requiring only one waveguide section 103 and one feed through 104 before terminating at end connector 106.

Figure 2B:
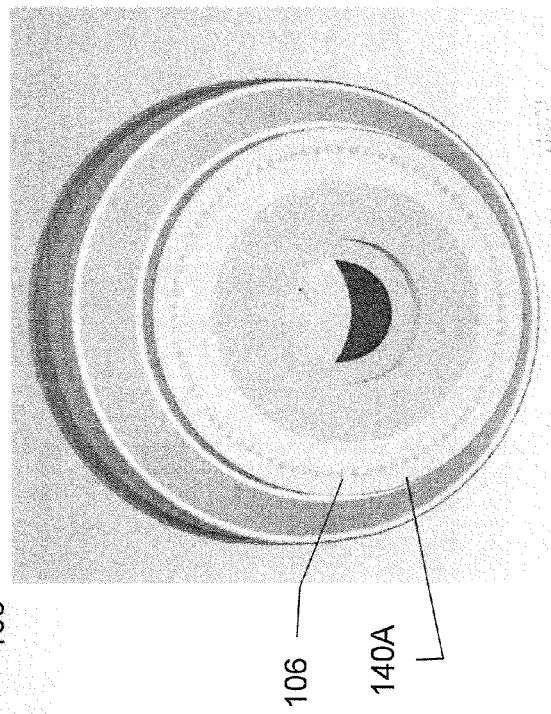
FIG. 2B is a bottom view of one embodiment of the feed element connectors.

FIG. 2B is a bottom view of one embodiment of the feed element end connectors 106, showing the bottom of support flange 140A.

Feed element 102 may be, in some exemplary embodiments, a conventional quarter-wavelength feed probe. Alternatively, other feed probe configurations as known and used by those of ordinary skill in the antenna arts may be used.

The feed elements 102 are fed (via end connectors 106, feed throughs 104, and waveguide sections 103, as discussed above) by a network of phase shifters and power dividers that can provide the necessary phase and amplitude control to each element of each GLA. Conventional feed probes for use in geodesic antennas are well known to those of ordinary skill in the antenna arts; see, for example and not by way of limitation, Patent Cooperation Treaty (PCT) Published Application No. WO 99/43046, "GEODESIC SLOTTED CYLINDRICAL ANTENNA," published on Aug. 26, 1999, incorporated herein by reference in its entirety. In general, the types of radiating structures that may be used are any type that can provide the proper impedance match within the waveguide cavity. A simple monopole is the most simple approach, but more complex forms may be used without limitation as long as the element has a broad "azimuth" pattern gain, in order to support propagation to the other side of the geodesic cone.

It is to be noted that feed element arrays 130A-130C do not necessarily (or even desirably) have the same number of feed elements or probes 102. This fact arises from the nature of the concentric rings or tiers on which each feed element arrays 130 is mounted: since the GLAs are concentric, the upper, outermost feed element array 130C has a larger circumference than the lowermost, bottom feed element array 130A. Since it is desirable to maintain the same radial spacing between feed elements 102 in every tier, the number of feed elements can vary from tier to tier. Accordingly, there is not as much radial space available to mount feed elements 102 on feed element array 130A versus feed element array 130C. In some embodiments, therefore, feed element array 130A may have relatively fewer elements 102 than feed element array 130B. Likewise, feed element array 130B may have relatively fewer elements 102 than feed element array 130C.

Feed element arrays 130A-130C are operably connected to a conventional feed network that may comprise, inter alia, a plurality of adjustable phase shifters and gain elements. Working in combination with a conventional beam steering computer (BSC), the phase and amplitude of the signal fed into each feed element may be varied to effect azimuthal control of the number, shape, and directionality of the RF beams produced in each geodesic lens antenna. The beams, each formed in separate GLA, combine to form a composite beam that is controlled in elevation by the relative phasing of each beam, as discussed in further detail below.

In one exemplary embodiment, each geodesic lens antenna may be separately constructed from a conductive material, such as but not limited to a metal or a metal-containing polymer. In one particular embodiment, the geodesic lens antenna may be constructed from aluminum according to conventional methods of antenna fabrication well known in the art.

The spaces between individual geodesic lens antenna elements in an array may be left unfilled. In an alternate embodiment, any of a number of conventional dielectric materials may be used to fill one or more of the GLA cavities to slow wave propagation as needed for a particular frequency of operation, bandwidth requirement, or other operational parameters. Accordingly, the concepts, systems, and techniques are not limited to any particular dielectric fill or encapsulation of the geodesic lenses that form the GLA array.

In one exemplary embodiment built and tested, a geodesic lens operating in C band was demonstrated. However, as will be appreciated by those of ordinary skill in the antenna arts, variations on a design may be scaled in operating frequency through the relatively simple expedient of scaling the geometry of the propagation and feed structures through conventional means. Accordingly, the concepts, systems, and techniques herein disclosed are not limited to any particular frequency band of operation.

FIG. 3 is a cut-away side view of the three-GLA array 100 of FIG. 1, according to one embodiment of the present invention.

Figure 4A:
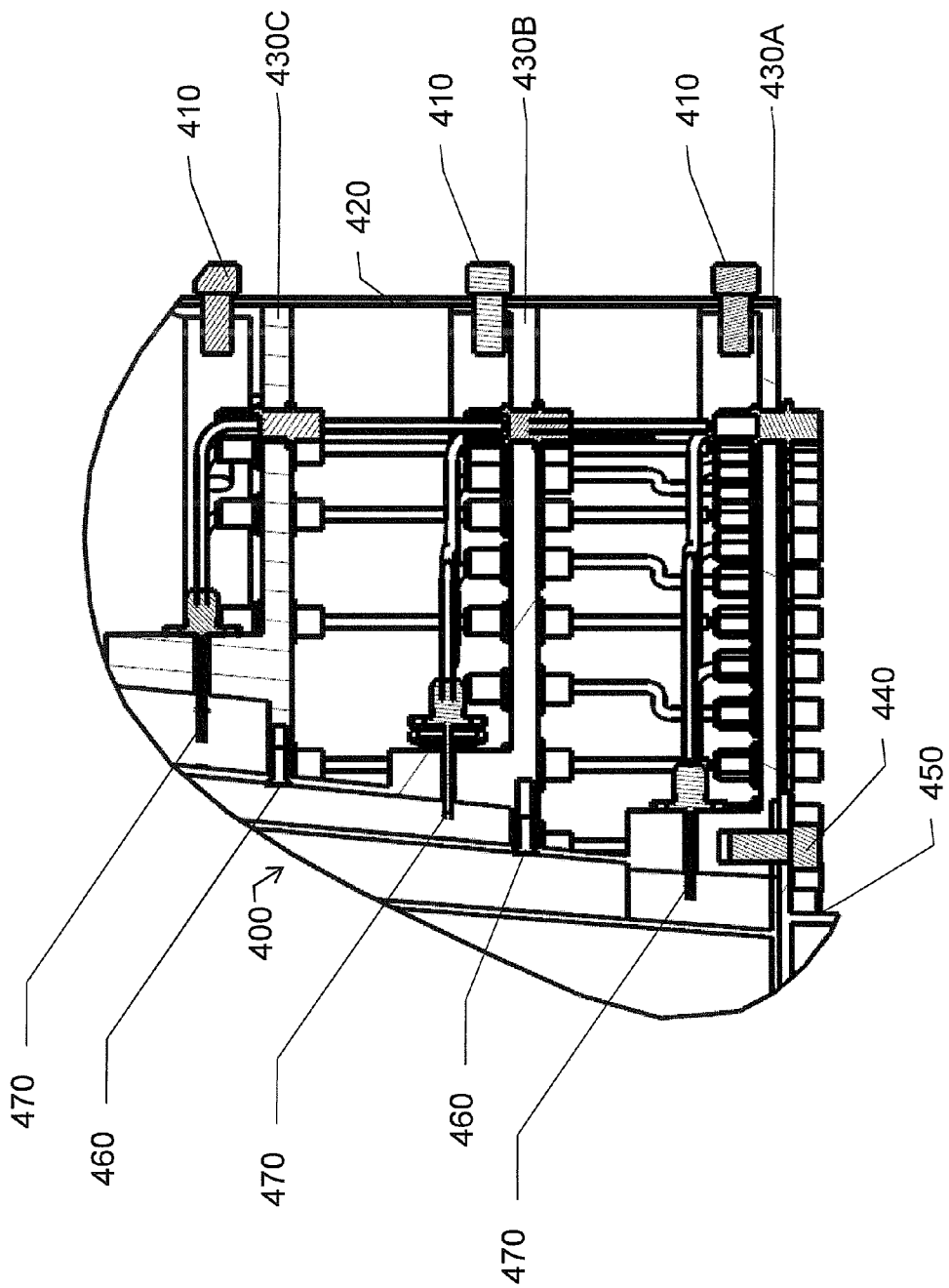
FIG. 4A is a section view of one embodiments of the feed elements, showing certain mechanical support details.

FIG. 4A is a sectional view of one embodiment of the feed elements 470 and mechanical attachments of the support flanges 430A-430C, showing certain mechanical support details according to one embodiment of the present invention. Here, fasteners 410 are employed to attach an outer housing 420 (which may be, in some embodiments, a radome or other environmental housing) to each of support flanges 430A, 430B, and 430C. Fastener 440 may be used to attach antenna assembly 400 (shown in partial view) to base 450. Fasteners 460 may be used to attach the inner edge of support flanges 430B and 430C to the inner wall of each GLA. Fasteners 410, 440, and 460 may be bolts, stud/nut combinations, or any other fastener system commonly used in the antenna arts, without limitation. Furthermore, such attachment may also be made using adhesives, welding, brazing, or any other attachment method known in the art.

In one exemplary embodiment, individual feed elements (or probes) 470 project about 0.375 inches into the waveguide, although it must be emphasized that the figures described herein are not necessarily to scale.

Figure 4B:
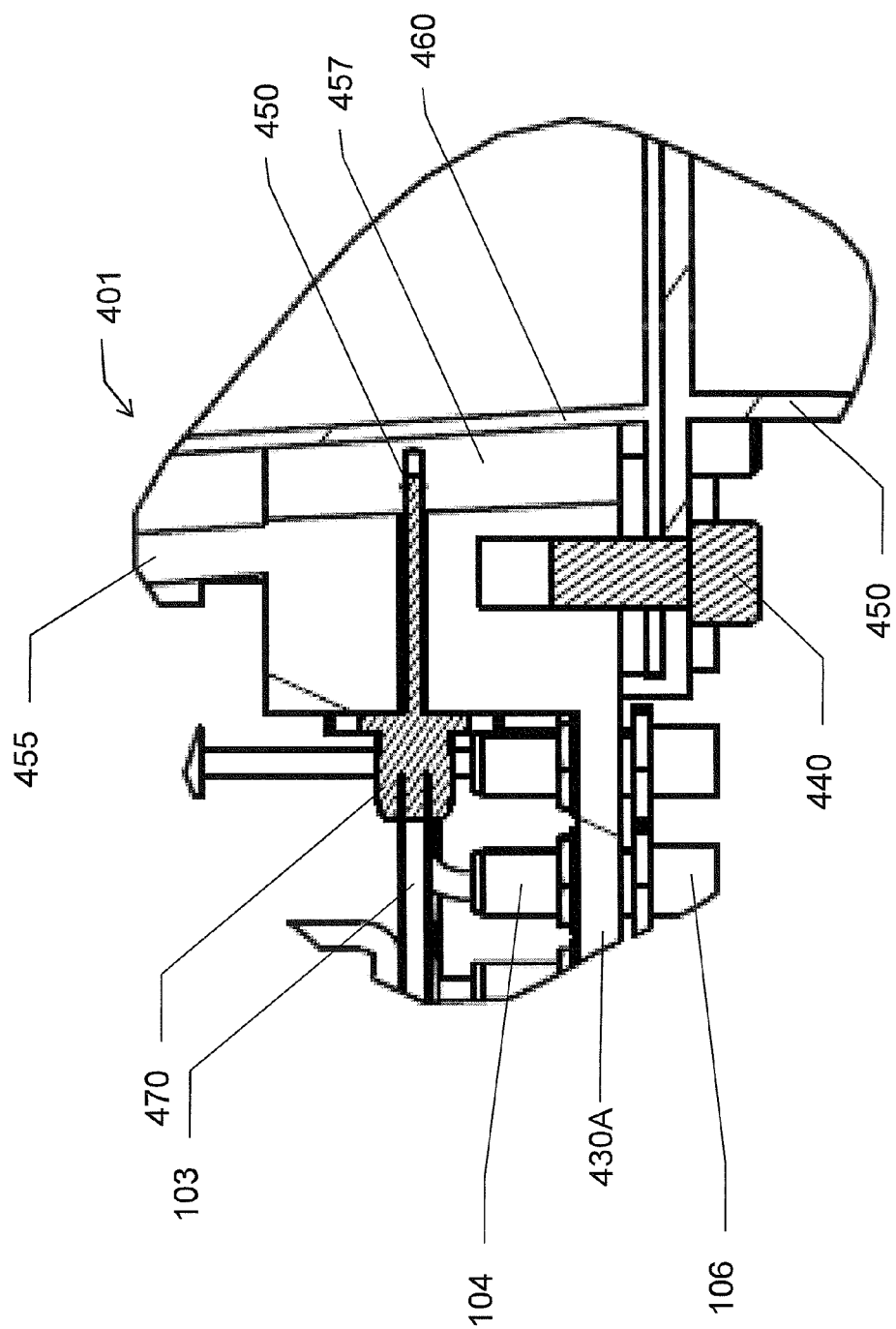
FIG. 4B is a section view of one aspect of the mechanical support at the base of the antenna, according to one embodiment of the present invention.

FIG. 4B shows certain details of a feed probe penetration 450 constructed according to one embodiment of the present invention. Probe 450 penetrates outer wall 455 of GLA 401, here shown as the outermost (or bottom) GLA in the assembly 400 of FIG. 4A. Probe 450 extends into cavity 457 formed by outer wall 455 and inner wall 460. Probe 450 is attached to outer wall 455 (which may be integrally formed with support flange 430A, as shown) by conventional means, such as (but not limited to) a sub-miniature "Version A" (SMA) connector 470. Connector 470 is attached to waveguide section 103. As discussed above with respect to FIG. 2A, waveguide section 103 may be routed and/or connected via conventional means through one or more feed throughs 104 before terminating in end connector 106.

End connector 106 may be any conventional waveguide connector known and used in the antenna art, without limitation. In one exemplary embodiment, end connector 106 is an SMA connector. However, although an SMA is described, those skilled in the art will realize that connectors 470 and/or 106, waveguides 103, and feed throughs 104 adapted for frequency bands of operation, mechanical configurations, and other common architectural requirements other than those typically suited for SMA connectors can be used. Accordingly, the concepts, systems, and techniques described herein are not limited to any particular type of connector, waveguide, and feed through, or to any particular frequency or bandwidth. The present system is equally useable across a wide range of operating frequencies and bandwidth, limited only by the achievable manufacturing tolerances of the materials selected by the ordinary practitioner.

Individual geodesic lens antenna elements may be constructed separately and then attached together with due care being paid to the alignment and avoidance of mechanical interference between the feed array elements. One of ordinary skill in the art will readily appreciate the mechanical assembly and adjustment requirements typically associated with such assemblies; integration is therefore readily achievable without undue experimentation.

FIG. 5 is an isometric illustration of a three-GLA array 500 with a surrounding radome 510, according to another embodiment of the present invention. Although a radome is described, those skilled in the art will realize that environmental protection and/or structural housings other than a conventional radome may be used. Accordingly, the concepts, systems, and techniques described herein are not limited to any particular type of external housing or structural support scheme.

Figure 7:
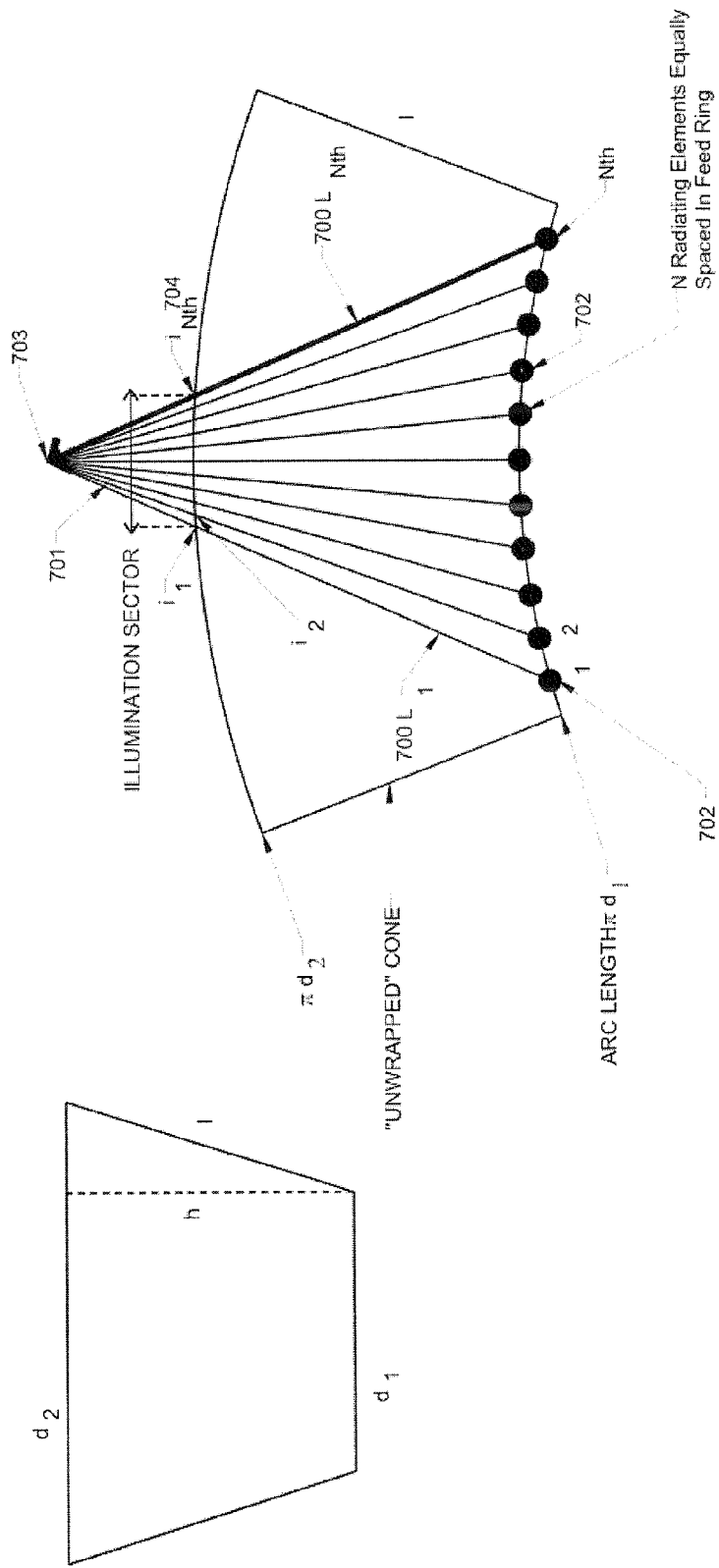
FIG. 7 is a representative geometric interpretation for use in calculating the azimuth portion of the beam steering vectors.

The determination of the relative phase of the signals applied at each feed element in a single GLA is well-known and relies on determining the geodesic length L 700 (referring to FIG. 7) from each feed element in the illumination sector 701 of the antenna. The combination of multiple geodesic lens antennas that enables elevation control requires additional calculations in order to set the relative phase and amplitude for each feed element in for each GLA to effect elevation beam steering.

Geodesic length L 700 is the length of each geodesic ray that intersects at a point in space where the outer-most two rays are conscribed by the desired illumination sector 701 (e.g., 60°, 90°, 120°, etc.) in the radiating slot (aperture) of each GLA (each GLA total sector is 360°). Each feed element 702 defines a ray within the illumination sector that extends from the feed probe to a common point in space 703. Each ray crosses the edge of the illumination sector at a point i 704 on the GLA; the length of L 700 and the locations of each point i is readily calculated according to well-known solid geometry techniques commonly use for a single, conventional geodesic lens antenna.

Figure 8:
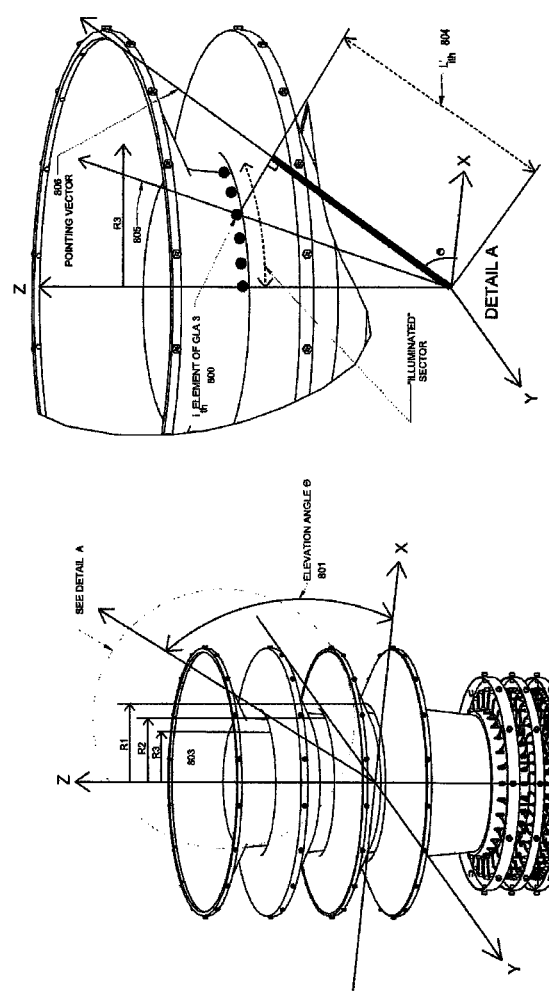
FIG. 8 is a representative coordinate system for use in calculating the elevation portion of the beam steering vectors.

Following is an example for the elevation portion of the phase calculation. For each point i 800 (referring to FIG. 8) on each GLA in an array of GLAs, a calculation of a second length, L' 804 representing the inner product (or projection) between a vector representing each point i 805 and the desired elevation pointing vector 806 is performed. The vector from the origin to each point i 800 must be represented in (x, y, z) coordinates 802 (i.e., Cartesian coordinates) centered on a point along the common central axis of all three GLAs located in the plane of the aperture slot of bottom-most (i.e., outer-most) GLA. A similar vector is formed for the desired pointing vector 806. For the coordinate system shown in FIG. 8, the radius of each GLA 803 is used to calculate the x and y components of the element i. The z component is the vertical distance from the coordinate system origin and the element i.

The sum of L 700 and L' 804 for each element is the total geodesic length for each feed element $L_{total}$. The phase command value for each element corresponding to each i is then $$\phi = L_{total} * \frac{2\pi}{\lambda}$$

where λ (lambda) is the wavelength of the center frequency of interest.

Figure 6:
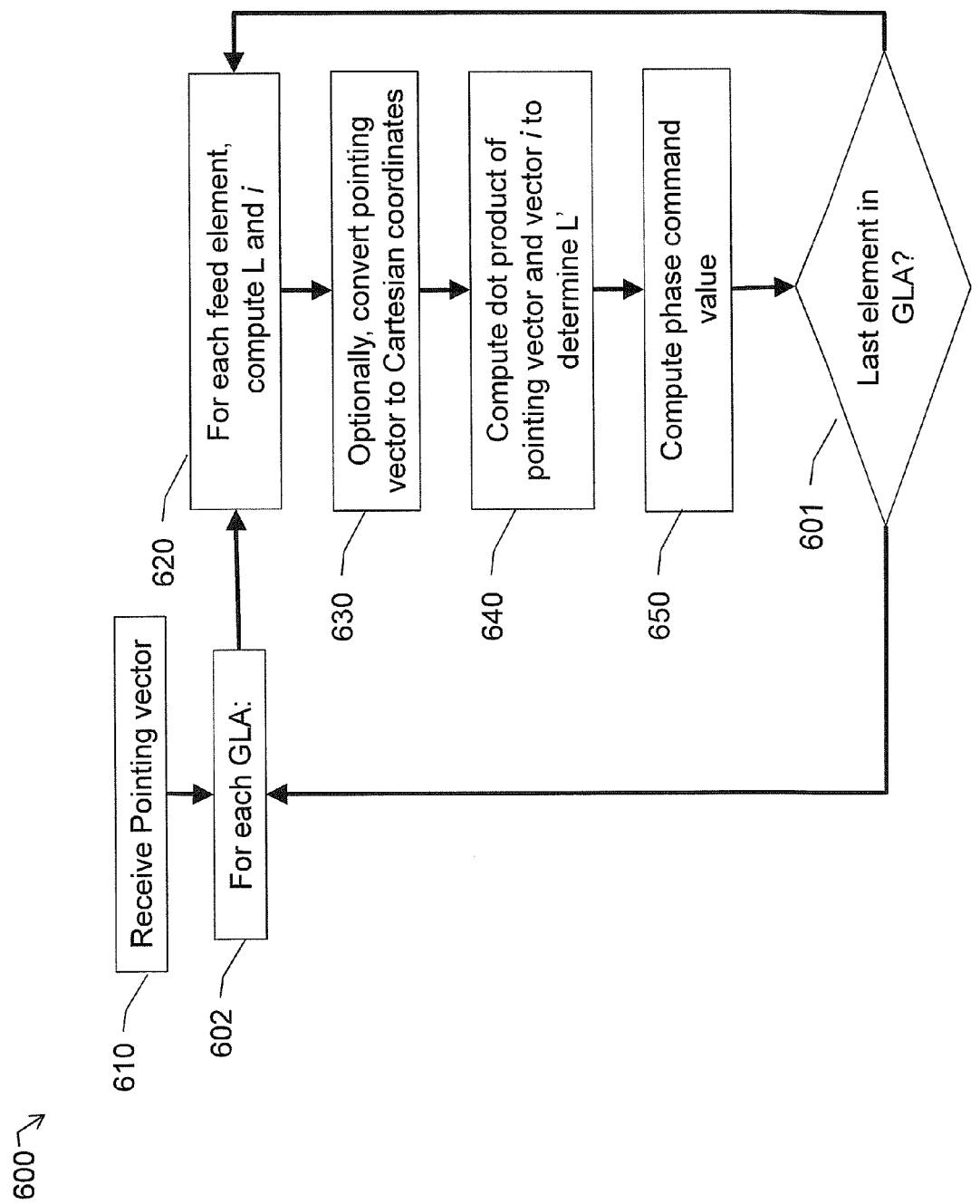
FIG. 6 is a flowchart of a method of controlling the beam steering in azimuth and elevation using an exemplary embodiment of the present system.

The process 600 by which the relative phase and amplitude for the signal at each feed element may therefore be summarized as shown in FIG. 6. In step 610, receive a pointing vector to the desired point in space P to which to steer the GLA array. In step 620, for each feed element in each GLA, compute L and vector i. In step 630, convert the pointing vector into Cartesian (x, y, z) coordinates, if necessary. Some embodiments may require different coordinate conversions, or none at all, depending on the means by which data is transferred and handled in the beam steering computer.

In step 640, compute the vector inner product (dot product) of vector i and the pointing vector to determine scalar L'. Finally, step 650, calculate the commanded phase value for the element using $L_{total}=L+L'$ and the equation above. The process then iterates for each feed element in each GLA according to loops 601 and 602, respectively.

The method described in this embodiment and the sample coordinate system may be used for calculation of the phase portion of the complex vector. Amplitude calculations depend on well-known methods where simultaneous equations are solved to achieve multiple spatial angle characteristics such and nulling, multiple main beams, sidelobe control, etc. Such calculations and computations are well-within the skill of one of ordinary skill in the art and need not be further disclosed herein.

The order in which the steps of the present method are performed is purely illustrative in nature. In fact, the steps can be performed in any order or in parallel, unless otherwise indicated by the present disclosure.

Geodesic lens arrays may be used with or integrated into or onto other radiating structures, such as but without limitation reflector antenna systems (e.g., Cassegrain, offset-fed, reflector array, or annular reflector systems), vehicles, spacecraft, airframes, ships, and the like. When mounted on or in such structures, a radome or other RF-transparent covering may cover the antenna. Such coverings may be conformed to the exterior dimensions of the mounting location (i.e., conformal antenna) or may be protected by armor of the like as necessary for the specific application. Accordingly, embodiments of the present concepts, systems, and techniques are not to be limited to any particular mounting or lack thereof but encompass all applications for which the present geodesic lens antenna array may be desirous.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:

1. An antenna array, comprising:
    a nested plurality of coaxial geodesic lenses, each said geodesic lens having a radial feed element array disposed at equal intervals around a proximate end of each said geodesic lens, the radial feed element array comprising a plurality of feed elements disposed in a feeding ring coaxial to the nested plurality of coaxial geodesic lenses; and
    a feed network operably connected to each said feed element array, said feed network comprising a plurality of adjustable phase shifters and gain elements providing separate gain and phase control to each respective geodesic lens in the nested plurality of lenses, such that each geodesic lens forms, for the antenna array, an elevation element having separate gain and phase control;
    wherein said adjustable phase shifters and gain elements are independently and simultaneously controlled to independently form and steer, in both azimuth and elevation at the same time, at least one beam radiated from the distal end of said nested plurality of coaxial geodesic lenses.

2. The antenna array of claim 1, wherein at least one of said nested plurality of coaxial geodesic lenses is constructed at least in part of a conductive material.

3. The antenna array of claim 1, wherein at least one of said nested plurality of coaxial geodesic lenses is constructed at least in part of a material selected from the group consisting essentially of aluminum, copper, gold, platinum, iridium, and alloys thereof.

4. The antenna array of claim 1, wherein the interior volume of one or more of said nested plurality of coaxial geodesic lenses is at least partially filled with a dielectric.

5. The antenna array of claim 1, wherein the antenna array is disposed to feed a reflector.

6. The antenna array of claim 1, wherein the antenna array is disposed to feed an array of reflectors.

7. The antenna array of claim 1, wherein said adjustable phase shifters and gain elements are controlled to form and steer multiple beams in both azimuth and elevation.

8. The antenna array of claim 1, wherein the nested plurality of geodesic lenses comprises multiple vertical radiating slots, each slot formed into an annulus, wherein each radiating slot is individually controlled by the respective feeding ring associated with each respective elevation element.

9. The antenna array of claim 1, further comprising a plurality of parallel waveguide channels that enable steering of an elevation beam produced using one or more elevation elements.

10. The antenna array of claim 1, wherein the feed network is further configured to provide feed element control in amplitude and phase to a respective one of the plurality of coaxial geodesic lenses relative to at least a portion of the other coaxial geodesic lenses, to provide further beam forming and steering of an elevation beam.

11. The antenna array of claim 1, wherein at least a portion of the plurality of coaxial geodesic lenses are aligned along a first axis and wherein at least a portion of the respective radial feed element arrays are disposed in a plane perpendicular to the first axis and are offset from one another along the first axis.

12. The antenna array of claim 1, wherein each respective radial feed element array is offset relative to at least a portion of the other respective radial feed element arrays.

13. The antenna array of claim 1, wherein the antenna array is in operable communication with a beam steering computer (BSC), the beam steering computer operable to:
    configure at least a portion of the plurality of adjustable phase shifters and gain elements to form, at each respective geodesic lens, a respective radio frequency (RF) beam; and
    combine one or more respective RF beams, each from a separate geodesic lens, into a composite beam that is controlled in elevation by a relative phasing of each respective RF beam.

14. The antenna array of claim 13, wherein the BSC is operable to vary the phase and amplitude of a signal fed into each respective feed element to effect azimuthal control of the number, shape, and directionality of the one or more respective RF beams.

15. An array of geodesic lens antennas (GLAs), the array comprising:
    a stacked, concentric, plurality of geodesic lens antennas (GLAs), each GLA comprising a vertical, radiating, slot individually controlled by a feed element array, the respective feed element array comprising a plurality of feed probes disposed in a feeding ring; and a plurality of individually adjustable phase shifters and gain elements in operable communication with each respective feed element array, the plurality of adjustable phase shifters and gain elements configured to provide separate gain and phase control to each GLA, wherein each GLA in the stacked, concentric plurality of GLAs forms a respective element in an elevation plane with separate amplitude and phase control.

16. The array of claim 15, wherein the adjustable phase shifters and gain elements are independently and simultaneously controlled to independently form and steer, in both azimuth and elevation at the same time, at least one beam radiated from the array of GLAs.

17. The array of claim 15, wherein each feed probe is equally spaced radially along a circumference of each respective GLA and offset relative to feed probes of the other GLAs.

18. The array of claim 15, wherein each respective GLA in the array is fed separately by a single set of feed probes all located in the same feed element array disposed at a first end of the stacked, concentric, plurality of GLAs.

19. The array of claim 15, wherein the array is in operable communication with a beam steering computer (BSC), the beam steering computer operable to:

configure at least a portion of the plurality of adjustable phase shifters and gain elements to form, at each respective geodesic lens, a respective radio frequency (RF) beam; and combine one or more respective RF beams, each from a separate GLA, into a composite beam that is controlled in elevation by a relative phasing of each respective RF beam.

20. The antenna array of claim 19, wherein the BSC is operable to vary the phase and amplitude of a signal fed into each respective feed probe to effect azimuthal control of the number, shape, and directionality of the one or more respective RF beams.

* * * * *